ELECTRONIC CURRENT REVERSER HAVING SINGLE INPUT CONTROLLING PLURAL OUTPUTS

Filed Oct. 28, 1964 2 Sheets-Sheet 1

INVENTORS
Karl Adler and Georges Ducommun
BY
Imirie & Smiley
Attys.

April 23, 1968 K. ADLER ET AL 3,379,898

ELECTRONIC CURRENT REVERSER HAVING SINGLE INPUT CONTROLLING PLURAL OUTPUTS

Filed Oct. 28, 1964 2 Sheets-Sheet 2

INVENTORS

Karl Adler and Georges Ducommun

BY Imirie & Smiley

Attys.

United States Patent Office 3,379,898

Patented Apr. 23, 1968

3,379,898

ELECTRONIC CURRENT REVERSER HAVING SINGLE INPUT CONTROLLING PLURAL OUTPUTS

Karl Adler, Grenchen, and Georges Ducommun, Feldbrunnen, Switzerland, assignors to Biviator S.A., Geneva, Switzerland Filed Oct. 28, 1964, Ser. No. 407,182
Claims priority, application Switzerland, Nov. 2, 1963, 13,479/63
9 Claims. (Cl. 307—244)

ABSTRACT OF THE DISCLOSURE

A static current reverser, wherein four transistors in a bridge are controlled each by an independent direct-current control potential produced by rectifying output signals of two alternating current sources having each a modulating input controlled each by a transistor of a pair of transistors controllable in complementary sense by a single direct-current input signal.

This invention relates to an electronic current reverser, and more particularly to an improvement of the current reverser disclosed in our copending patent application No. 284,719, now Patent No. 3,344,331, and comprising a direct current source and a load, a bridge circuit having controllable circuit elements such as transistors in its branches, said current source and load being connected to the input and output respectively of said bridge circuit, means producing one single input signal, means for amplifying this input signal and means for producing independent control signals from said amplified input signal for control of each of said controllable elements. Therefore, the general object of this invention is to produce a number of independent control signals from one single input signal in a simple and efficient manner. It is a particular object of this invention to provide input circuits adapted to be controlled by the said single input signal and to control alternating current signals to be amplified in push-pull or complementary relation to the said input signal. It is a further object of this invention to provide input circuits of the above type adapted to operate without mutual interference at their input and to produce clearly differentiated control signals of opposite effect at their output.

These and other objects are achieved according to this invention by providing a pair of controllable elements, for instance transistors connected to and adapted to be controlled by said means producing one single input signal in a complementary manner, each element of said pair of controllable elements being connected to the input of said amplifying means for complementary control of such amplifying means.

Embodiments of this invention are shown, by way of example, in the attached drawings, wherein.

Figure 1:
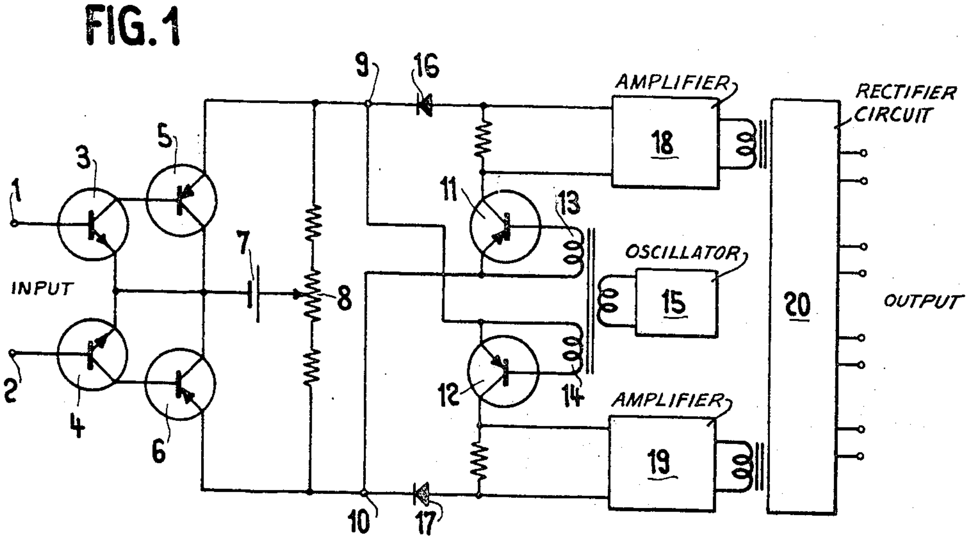
FIG. 1 is a circuit diagram of the first embodiment.

The circuit shown in FIG. 1 has input terminals 1 and 2 to which the input signal produced for instance by two elements connected in opposition as shown in our above copending application, may be applied. Terminals 1 and 2 are each connected to the base of a npn-transistor 3 and 4 resspectively. The collectors and emitters of transistors 3 and 4 are connected to the base and the collector respectively of pnp-transistors 5 and 6. Transistors 5 and 6 are connected in two adjacent branches of the one arm of a bridge circuit energized by a source 7 and having a balancing potentiometer 8 in its other arm.

The output of the bridge circuit is connected to the input of a modulator circuit. To the input terminals 9 and 10 of the modulator circuit are connected two transistors 11 and 12 in opposite direction. Transistors 11 and 12 are controllable by means of alternating voltages induced in independent secondary windings 13 and 14 of the output transformer of an oscillator 15. Diodes 16 and 17 are series connected with the transistors 11 and 12. The output terminals of the modulator transistors 11 and 12 are connected to the input terminals of amplifiers 18 and 19. The output transformers of amplifiers 18 and 19 are parts of a schematically illustrated rectifier circuit 20 for producing four independent control signals. Circuit 20 is not per se an object of this invention and it is shown in detail in our above copending patent.

With no potential difference at the input terminals 1 and 2 the bridge circuit is in balance condition and no signal appears at its output terminals. Consequently the modulator transistors 11 and 12 are without current and no modulation can take place. No voltage appears at the output of amplifiers 18 and 19. When a potential difference appears at input terminals 1 and 2 different currents flow in transistors 3 and 4 and consequently different currents flow in transistors 5 and 6. The bridge circuit is thus unbalanced and a voltage difference appears at the bridge output and at input terminals 9 and 10 of the modulator circuit respectively. When the input terminal 9 is positive relatively to the input terminal 10, a current flows from terminal 9 through transistor 12, the load resistor of the same and diode 17 back to terminal 10. Transistor 12 is now operative as a modulator so that an alternating voltage appears at the input of amplifier 19. The amplified output voltage of amplifier 19 produces four independent control signals in circuit 20 for control of the transistors of the current reversing bridge. As set out above, a circuit of this type is shown in our above copending application. Under the above condition, wherein terminal 9 is positive relatively to terminal 10, the diode 16 and the modulating transistor 11 are connected in backward direction to the input voltage, so that no current flows in such elements and no modulation occurs in transistor 11. When a potential difference of opposite direction is applied to terminals 9 and 10, a current will now flow in the transistor 11 while transistor 12 is deenergized. Amplifier 18 only is now operative for amplification of an alternating current signal so that the circuit 20 produces control signals of opposite direction by which the current reversing bridge changes into its opposite operating condition and the current flow at the bridge output is reversed as explained in our above prior application. The circuit shown in FIG. 1 has an excellent sensitivity and high stability. The input may be controlled by signals in the order of 0.1 nA. and 1 microvolt, whereby output power in the order of 500 w. at the reversing bridge output may be obtained. Preferably, pairs of complementary directly coupled transistors similar to the pairs of transistors 3 and 5 in FIG. 1 may also be used in the current reversing bridge, whereby such pairs of transistors are connected into each bridge branch and whereby the control signals are applied between the base and the emitter of the npn-transistor.

Figure 2:
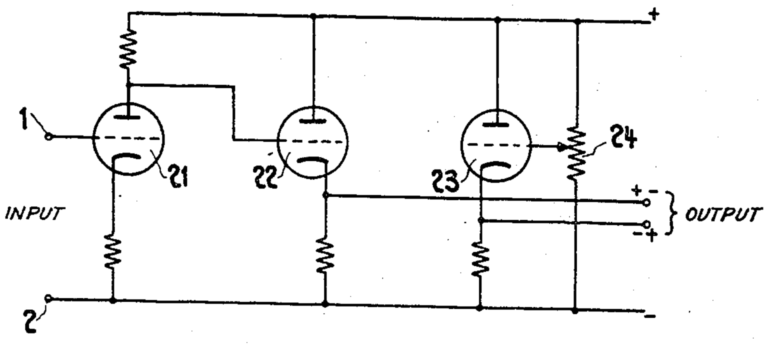
FIG. 2 is a circuit diagram of a modified preamplifier having a particularly high input impedance.

In order to obtain an even higher input impedance an input circuit as shown in FIG. 2 may be used instead of the input bridge of FIG. 1. The input terminals 1 and 2 are connected to the grid circuit of a tube 21 of which the cathode has a positive bias potential in order to avoid grid current. The anode of tube 21 is directly coupled with the grid of a tube 22. The one output terminal of the circuit is connected to the cathode of tube 22. The grid of another output tube 23 having the same characteristics as tube 22, is maintained at a fixed potential by means of a potentiometer 24. The other output terminal of the circuit is connected to the cathode of tube 23.

For calibration of the circuit shown in FIG. 2 terminals 1 and 2 are short-circuited and the potentiometer 24 is so adjusted that no potential appears at the output terminals or at the cathodes of tubes 22 and 23. When a voltage difference is applied to terminals 1 and 2 the current flow in tube 21 and consequently the potential at the grid of tube 22 is changed. Therefore, the current flow in tube 22 is also changed and since the current flow in tube 23 is constant, a potential difference appears at the output terminals of which the direction and magnitude depends on the direction and value of the input signal applied to terminals 1 and 2. The cathode-follower operation of tubes 22 and 23 is particularly suitable for impedance matching of the tube circuit to the transistorized modulator circuit connected to its output terminals.

Figure 3:
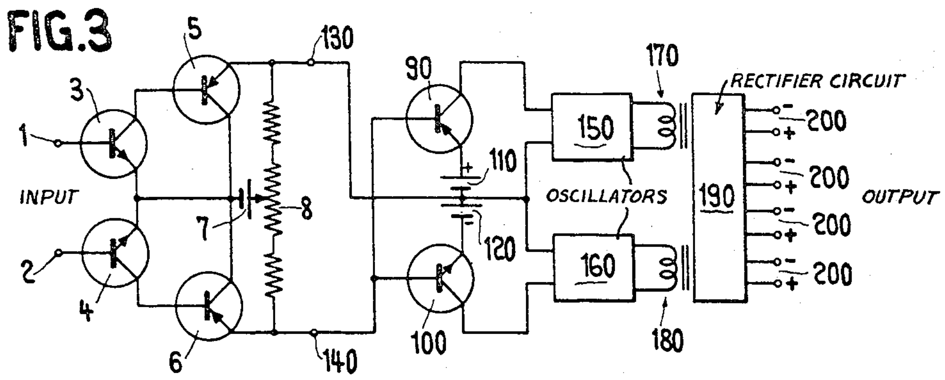
FIG. 3 is a circuit diagram of a second embodiment.

The embodiment shown in FIG. 3 has the same bridge input amplifier comprising elements 1 to 8 as the first embodiment shown in FIG. 1. The output of the bridge amplifier is connected to the input of a control circuit comprising complementary transistors 90 and 100. The emitters of transistors 90 and 100 are connected through independent voltage sources 110 and 120 to the input terminal 130. The directly interconnected bases of transistors 90 and 100 are connected to the other input terminal 140. The independent output circuits of transistors 90 and 100 are connected to the control terminals of current-controlled or voltage-controlled oscillators 150 and 160. In other words oscillators 150 and 160 are modulated by the associated transistors 90 and 100 respectively. For the following explanation of the operation it is assumed that both oscillators 150 and 160 are cut off and do not oscillate at no potential difference at the input terminals when rest currents of the same magnitude flow in transistors 90 and 100, but that oscillation starts as soon as the current flow in the associated transistor exceeds the above rest current. Oscillators 150 and 160 have output transformers 170 and 180 for energizing an output circuit 190 of the type explained above with reference to FIG. 1, for producing independent control signals for the current reversing bridge at output terminals 200.

When no potential difference appears at input terminals 1 and 2 the bridge amplifier is balanced so that no potential difference is produced at the input terminals 130 and 140 of transistors 90 and 100. Due to the absolutely symmetrical arrangement equal currents flow in transistors 90 and 100 and the base currents of such transistors completely compensate each other. Therefore, the balance condition of the bridge amplifier is not affected in any way by feedback from transistors 90 and 100. As assumed above the oscillators 150 and 160 are inoperative for this balanced condition of the circuits and no output signals appear at the output of oscillators 150 and 160. Therefore, no control signals are produced at the output terminals 200 of the output circuit 190 and the current reversing bridge is in balanced condition. When a signal of a predetermined direction is applied to input terminals 1 and 2, the bridge amplifier is unbalanced so that a corresponding potential difference appears at the output terminals 130 and 140. When terminal 130 is positive relatively to terminal 140 the current flow in transistor 90 increases while the current flow in transistor 100 decreases. Accordingly an oscillation is set up in oscillator 150 whereas oscillator 160 remains inoperative. The alternating voltage applied to the output circuit 190 through output transformer 170 produces output signals at all pairs of terminals 200, whereby the current reversing bridge controlled by such signals in the manner set out in our above application is unbalanced in a predetermined direction. When an input differential signal of opposite direction is applied the current flow in transistor 90 decreases and the current flow in transistor 100 increases, whereby oscillator 150 is cut off while oscillator 160 starts. Consequently control signals of opposite polarity appear at the output terminals 200 of circuit 190 whereby the current reversing bridge is unbalanced in opposite direction and a current of opposite direction flows at the bridge output.

The circuit shown in FIG. 3 has a high sensitivity and stability in the order set out above for the circuit shown in FIG. 1. Further, the current reversing bridge controlled by the circuit of FIG. 3 may also be equipped with pairs of complementary transistors as set out above. Instead of the bridge amplifier shown in FIG. 3, the tube amplifier shown in FIG. 2 may be used as a preamplifier in the circuit of FIG. 3 when a particularly high-impedance input is desired.

Figure 4:
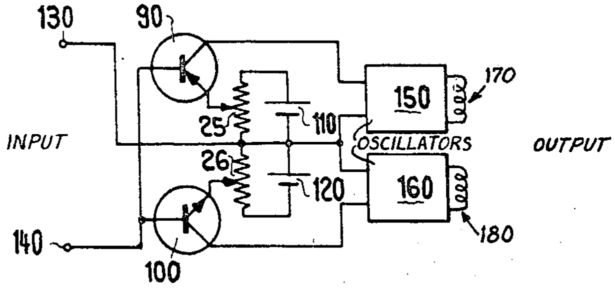
FIGS. 4 and 5 are circuit diagrams of modified forms of the second embodiment.

As explained above, the direct connection of the emitters of transistors 90 and 100 with the independent sources 110 and 120 causes a rest current at balance condition in transistors 90 and 100. A relatively low input impedance matched to the output impedance of the transistorized bridge amplifier shown in FIG. 1 is thus obtained. In order to adjust the rest currents in transistors 90 and 100 and in order to completely balance the circuit, adjustable bias potential sources having potentiometers 25 and 26 as shown in FIG. 4 may be used instead of the sources 110 and 120 shown in FIG. 3.

Figure 5:
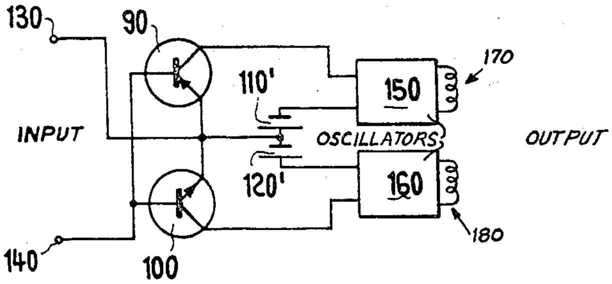

When a higher input impedance of the circuit comprising transistors 90 and 100 is desired, sources 110′ and 120′ respectively may be connected into the collector circuits of transistors 90 and 100 as shown in FIG. 5 so that only extremely low rest currents flow in such transistors at zero input signal.

Any of the circuits shown in FIGS. 1 and 3 may also be used without preamplifier. As an example, the bridge amplifier shown in FIGS. 1 and 3 may be replaced by a measuring bridge wherein at least one of transistors 5 and 6 is replaced by a measuring element.

What we claim is:

1. A static current reverser comprising in combination a direct current source and a load, a bridge circuit having controllable circuit elements in its branches, said current source and load being connected to the input and output respectively of said bridge circuit, means for producing a single direct-current input signal, two independent alternating current sources having each an output, a rectifier circuit having four independent direct current outputs connected each to one of said controllable circuit elements of the bridge circuit and two independent inputs connected each to one of said alternating current sources, a modulating input in each of said alternating current sources for amplitude control at the output of each alternating current source, a pair of transistors having each an input circuit and an output circuit, the input circuits of both transistors and said means for producing a single direct current input signal being connected into a common input circuit adapted for complementary control of such transistors, and the output circuit of each transistor being connected to the modulating input of the one of said alternating current sources.

2. A current reverser according to claim 1, comprising an oscillator, said transistors being connected in opposite polarity with their collector-emitter circuit to said means producing the single input signal, the one or other of said transistors carrying current in its emitter-collector circuit according to the polarity of said input signal, a load in the emitter-collector circuit of each transistor, said oscillator being connected into the base-emitter circuit of each transistor, a pair of alternating current amplifiers having each an input connected to the load of one of said transistors and an output connected to said rectifier circuit.

3. A current reverser according to claim 2, comprising a diode series-connected with each of said transistors.

4. A current reverser according to claim 2, wherein said means for producing an input signal comprise a bridge amplifier having two input transistors with the base of each input transistor connected to one of a pair of input terminals and the emitter of each input transistor connected to a common bridge terminal.

5. A current reverser according to claim 1, comprising a pair of complementary transistors having input circuits connected in parallel to said means for producing an input signal, a pair of oscillators having each a modulating input and an output, an output circuit in each of said transistors connected to the modulating input of one of said oscillators, and the outputs of said oscillators being connected to said rectifier circuit.

6. A current reverser according to claim 5, wherein the emitter of each of said complementary transistors is connected through a voltage source to the one terminal and the base of each of the complementary transistors is connected to the other terminal of said means for producing an input signal.

7. A current reverser according to claim 5, wherein the emitters of the complementary transistors are directly connected to the one terminal and the bases of the complementary transistors are directly connected to the other terminal of said means for producing an input signal.

8. A current reverser according to claim 1, comprising a tube preamplifier having a high impedance input circuit and a low-impedance output circuit connected into said common input circuit of said transistors.

9. A current reverser according to claim 8, the tube amplifier having two output tubes in cathode-follower connection, one of such output tubes being controllable from the amplifier input.

References Cited

UNITED STATES PATENTS

| | | | |
|---|---|---|---|
| 2,728,856 | 12/1955 | Hannum et al. | 331—49 |
| 2,783,384 | 2/1957 | Bright et al. | 307—88.5 |
| 2,938,174 | 5/1960 | Bulleyment | 307—88.5 X |
| 2,962,603 | 11/1960 | Bright | 307—88.5 |
| 3,089,963 | 5/1963 | Djorup | 307—88.5 |
| 3,263,150 | 7/1966 | Britten et al. | 307—88.5 |

JOHN S. HEYMAN, *Primary Examiner.*